United States Patent
Kongara et al.

(10) Patent No.: US 10,824,541 B1
(45) Date of Patent: Nov. 3, 2020

(54) SYSTEM AND METHOD FOR TEST DATA FABRICATION

(71) Applicant: State Farm Mutual Automobile Insurance Company, Bloomington, IL (US)

(72) Inventors: Venkata Ramarao Kongara, Fairview, TX (US); Matthew Joseph Jarrett, Wylie, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 20 days.

(21) Appl. No.: 16/164,475

(22) Filed: Oct. 18, 2018

(51) Int. Cl.
*G06F 9/44* (2018.01)
*G06F 11/36* (2006.01)
*G06F 8/71* (2018.01)

(52) U.S. Cl.
CPC ............ *G06F 11/3664* (2013.01); *G06F 8/71* (2013.01)

(58) Field of Classification Search
CPC .............................. G06F 8/71; G06F 11/3664
USPC ........................................................ 717/125
See application file for complete search history.

(56) References Cited

U.S. PATENT DOCUMENTS

| | | | |
|---|---|---|---|
| 6,002,869 A | 12/1999 | Hinckley | |
| 6,301,701 B1 | 10/2001 | Walker et al. | |
| 6,633,878 B1 * | 10/2003 | Underwood | G06Q 10/10 |
| 7,890,806 B2 * | 2/2011 | Kwong | G06F 11/3688 717/124 |
| 8,185,877 B1 | 5/2012 | Colcord | |
| 8,671,387 B2 * | 3/2014 | Quine | G06F 9/45529 717/105 |
| 8,793,660 B2 | 7/2014 | Belihomji et al. | |
| 9,811,248 B1 | 11/2017 | Berg et al. | |
| 2004/0255179 A1 * | 12/2004 | Mayer | G06F 9/4406 714/1 |
| 2006/0010426 A1 | 1/2006 | Lewis et al. | |
| 2006/0101418 A1 * | 5/2006 | Barsness | G06F 11/3664 717/130 |
| 2008/0162888 A1 * | 7/2008 | Krauss | G06F 11/3636 712/216 |

(Continued)

OTHER PUBLICATIONS

Title: Using annotations to support multiple kinds of versioning in an object-oriented database system author: E Sciore published on 1991.*

*Primary Examiner* — Chameli Das
(74) *Attorney, Agent, or Firm* — Faegre Drinker Biddle & Reath

(57) ABSTRACT

Systems and methods for building and executing a test for a software application. The system includes a database for storing variable value protocols, output files, and data related thereto. A computing device is in communication with the database and is configured to create and/or modify the variable value protocols. The computing device includes an interface having a plurality of sections for displaying the variable value protocols and variables related thereto. The computing device is configured to receive values to define selected variables of the variable value protocols and receive values from a data fabrication engine for variables that were not selected. The computing device is configured to notify a user that a current version of the software application treats one of the selected variables different than a previous version of the software application.

20 Claims, 6 Drawing Sheets

(56) References Cited

U.S. PATENT DOCUMENTS

| | | | |
|---|---|---|---|
| 2008/0178161 A1* | 7/2008 | Cates | G06F 11/3664 |
| | | | 717/133 |
| 2008/0222454 A1 | 9/2008 | Kelso | |
| 2009/0125826 A1 | 5/2009 | Haggerty et al. | |
| 2009/0319832 A1 | 12/2009 | Zhang et al. | |
| 2012/0173557 A1* | 7/2012 | Russell | G06F 8/71 |
| | | | 707/756 |
| 2014/0047418 A1* | 2/2014 | Bryan | G06F 9/449 |
| | | | 717/136 |
| 2015/0074646 A1* | 3/2015 | Herrin | G06F 8/71 |
| | | | 717/124 |
| 2015/0254161 A1* | 9/2015 | Baril | G06F 11/3616 |
| | | | 717/124 |
| 2016/0328316 A1 | 11/2016 | Balsavias | |
| 2018/0217921 A1 | 8/2018 | Palyekar et al. | |
| 2018/0293157 A1 | 10/2018 | Dougherty et al. | |
| 2019/0026320 A1* | 1/2019 | Sharma | G06F 8/60 |

* cited by examiner

SYSTEM AND METHOD FOR TEST DATA FABRICATION

CROSS-REFERENCE TO RELATED APPLICATIONS

Certain aspects of the invention described in this non-provisional patent application are related to co-pending non-provisional U.S. application Ser. No. 16/164,428, filed on Oct. 18, 2018, titled "Systems and Methods for Test Data Fabrication," incorporated by reference herein in its entirety.

FIELD OF THE INVENTION

The present disclosure generally relates to development interfaces, computer-implemented methods, systems comprising computer-readable media, and electronic devices for defining a test for a software application.

BACKGROUND

Test development tools may be used to create tests for testing software applications. Tests may include a series of inputs into a software application to simulate a user's selections. Software applications may be syntactically correct and therefore pass compiler scrutiny, but they sometimes include bugs or glitches that present functionality problems for a user. The tests are run to ensure that the software application is operating in accordance with desired objectives.

This background discussion is intended to provide information related to the present invention which is not necessarily prior art.

BRIEF SUMMARY

Embodiments of the present technology relate to development interfaces, computer-implemented methods, systems comprising computer-readable media, and electronic devices for defining a test for a software application. The embodiments may enable generation of a test comprising multiple variable value protocols having variables that may have both pre-defined values and values generated by a data fabrication engine. The embodiments may also enable easy-to-use navigation of the plurality of tests, variable value protocols, selected variables, and selectable variables. The embodiments may also enable automatic detection of changes to software applications, such as revisions of pre-defined conditions of variables within the applications.

More particularly, in a first aspect, a test development interface implemented on a computing device for at least partly defining a test for a software application. The test development interface may include a plurality of sections to be displayed on a screen of the computing device. The sections may include a variable value protocol section, a selected variables section, an all variables section, and a bundle section. The variable value protocol section may be configured to display representations of a plurality of variable value protocols and receive a selected variable value protocol, each variable value protocol including a set of one or more selected variables and a set of one or more selectable variables. The selected variables section may be configured to display at least one of the one or more selected variables corresponding to the selected variable value protocol; receive manually-inputted values for at least a portion of the one or more displayed selected variables corresponding to the selected variable value protocol; and display the manually-inputted values. The all variables section may be configured to display the set of selectable variables of the selected variable value protocol. The bundle section may be configured to receive at least one of the plurality of variable value protocols and display the at least one received variable value protocol to represent scheduling of the test. The test development interface may include additional, less, or alternate functionality, including that discussed elsewhere herein.

In another aspect, a computer-implemented method for defining and initiating a test for a software application. The method may include displaying a plurality of variable value protocols at a user interface, each variable value protocol including a set comprising one or more selectable variables; receiving a selection of one of the plurality of variable value protocols via the user interface, the selected variable value protocol corresponding to the software application; displaying the set of selectable variables corresponding to the selected variable value protocol at the user interface; receiving a selection of a selected variable of the corresponding set of selectable variables via the user interface; receiving a value defining the selected variable via the user interface; receiving input directing scheduling a test of the selected variable value protocol via the user interface; in response to the input, scheduling the test of the software application; automatically identifying at least one underdefined variable of the corresponding set of selectable variables, each of the at least one underdefined variable requiring a value; automatically requesting and receiving from a data fabrication engine at least one value for each of the at least one underdefined variable; and automatically executing the test at least in part by passing the values for the set of selectable variables to the software application. The method may include additional, less, or alternate actions, including those discussed elsewhere herein.

In another aspect, a non-transitory computer-readable storage media having computer-executable instructions for defining and initiating a test for a software application. The computer-readable instructions may instruct a processing element of a computing device to display representations of a plurality of variable value protocols at a user interface, each variable value protocol including a set comprising a plurality of selectable variables; receive a selection of one of the plurality of variable value protocols via the user interface, the selected variable value protocol corresponding to the software application; display the set of selectable variables corresponding to the selected variable value protocol at the user interface; receive a selection of a selected variable of the corresponding set of selectable variables via the user interface; receive a value defining the selected variable via the user interface; receive input directing scheduling of the selected variable value protocol via the user interface; in response to the input, schedule the test of the software application; automatically identify at least one underdefined variable of the corresponding set of selectable variables, each of the at least one underdefined variable requiring a value; automatically request and receive from an automation script at least one value for each of the at least one underdefined variable; and automatically transmit the test to an executing device. The computer-readable instructions may instruct the processor(s) to perform additional, fewer, or alternative actions, including those discussed elsewhere herein.

In another aspect, a computer-implemented method for version tracking of a software application to identify variations in treatment of an input variable. The method may include automatically executing, via an executing device, a first version of the software application to generate a first output file; automatically executing, via the executing device, a second version of the software application to generate a second output file; automatically comparing the first output file against the second output file to identify an output variation between the first output file and the second output file attributable to the input variable between the first version and the second version; and automatically writing data representing the input variable to a record in response to the identification of the output variation. The method may include additional, less, or alternate actions, including those discussed elsewhere herein.

In another aspect, a computer-implemented method for version tracking of a software application to automatically identify variations in treatment of an input variable. The method may include automatically receiving a value for the input variable from a variable value protocol; automatically executing a latest version of the software application; automatically submitting the value to the latest version of the software application; automatically determining a first output from the latest version of the software application attributable at least in part to submission of the value of the input variable; automatically retrieving from a database storing a second output attributable at least in part to submission of a previous value of the input variable in connection with execution of a previous version of the software application; automatically comparing the first output against the second output to identify a variation between the first output and the second output at least partly attributable to varied treatment of the values of the input variable between the latest version and the previous version of the software application; and automatically writing data representing the input variable to a record in response to the identification of the variation. The method may include additional, less, or alternate actions, including those discussed elsewhere herein.

In still another aspect, a system for version tracking of a software application to identify an output variation in treatment of an input variable represented in a variable value protocol corresponding to the software application. The system may include a test protocol database and a computing device in communication with the test protocol database. The test protocol database may be configured to store the variable value protocol, an automation script corresponding to the software application, and results of testing a previous version of the software application, the results being at least partly attributable to the input variable. The computing device may be configured to retrieve from the test protocol database the variable value protocol, the automation script, and the results; receive a value for the input variable; execute a latest version of the software application; submit the value to the latest version of the software application according to the automation script; determine a first output from the latest version of the software application attributable at least in part to submission of the value of the input variable; compare the first output against the results to identify the output variation; and write data corresponding to the input variable to a record in response to the identification of the output variation. The system may include additional, less, or alternate functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Existing development systems for software application tests enable modification of specific test functions. This enables testing of specific aspects of the software application. However, existing systems do not provide flexibility in the burden of manual definition imposed on users during the test development process, nor do they provide robust context to users supporting manual definition processes.

According to embodiments of the present invention, a user may utilize a system and/or test development interface to create and/or modify a test having one or more variable value protocols defining a plurality of variables. The test may be related to at least one software application. The user may utilize the interface to configure the test to focus on a specific component of a software application, for example to ensure that the component is functional and consistent with the software application's objectives. The interface may also enable the user to save all and/or specifically-configured portions of the test for later use.

In embodiments where the user manually defines values of variables involved in the test, the values may be automatically verified for satisfaction of pre-defined conditions, parameters and/or limitations. This enables a user to test specific, abstract portions of one or more software applications.

Further, the system may automatically identify and alert the user of changes to pre-defined conditions applicable to, and/or treatment of, an input variable represented in a variable value protocol. For example, the system may be configured to automatically determine whether a pre-defined condition has recently been changed for an input variable selected by the user for manual definition, and may automatically generate an alert relating thereto for display to the user. For another example, the system may be configured to automatically determine that a recent revision to a software application resulted in a change in treatment of an input variable by the software application, as compared against treatment by a previous version of the software application. The system may be configured to automatically generate an alert relating to the differing treatment for display to the user in response to selection of the input variable for manual definition. One of ordinary skill will appreciate that various changes to software applications, variable value protocols and/or automation scripts may be automatically identified, and that various automated alerts relating such changes to a user may be generated, within the scope of the present invention.

Exemplary System

Figure 1:
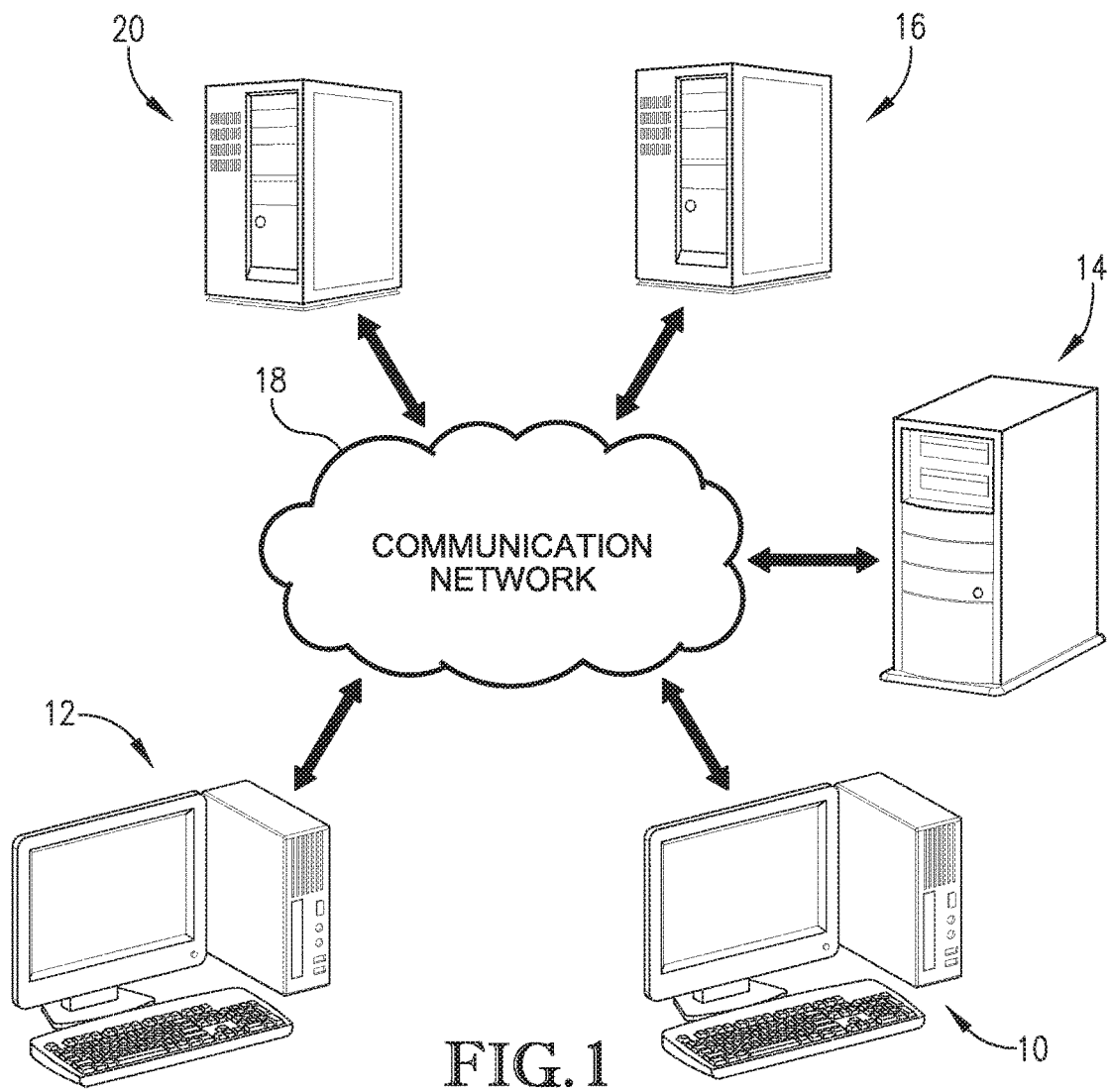
FIG. 1 illustrates various components, in block schematic form, of an exemplary system for defining and initiating a test for a software application.

FIG. 1 depicts an exemplary environment for developing and initiating tests of software applications according to embodiments of the present invention. The environment may include a plurality of computing devices 10, 12, one or more servers 14, one or more database servers 16, a communication network 18, and a communication server 20. The communication network 18 may be comprised of a plurality of networks including any internal networks that connect the computing devices 10, 12, the plurality of servers 14, the plurality of database servers 16, and/or the communication server 20. All or part of an internal network may be implemented via the communication server 20. For instance, the communication server 20 may execute a software program configured to provide a communication platform, which may comprise a trusted internal network, bulletin board system, or the like.

The computing devices 10, 12, servers 14, and database servers 16 may be connected to the communication server 20. Users may connect to the communication server 20 using a terminal program or the like and/or the communication network 18. For example, the communication server 20 may include one or more servers running Citadel™ software, an open source internal communications system employing room-based software architecture.

The computing devices 10, 12 may be workstations, as described in more detail below. The computing device 10 may be operated by a test manager. The test manager may build and/or modify tests for software applications at computing device 10, for execution, for future use, and/or use by other test managers. The computing device 12 may be a workstation used by a software application developer. The developer may, for example, build and/or modify versions of the software applications that are tested by tests configured by test managers.

Figure 2:
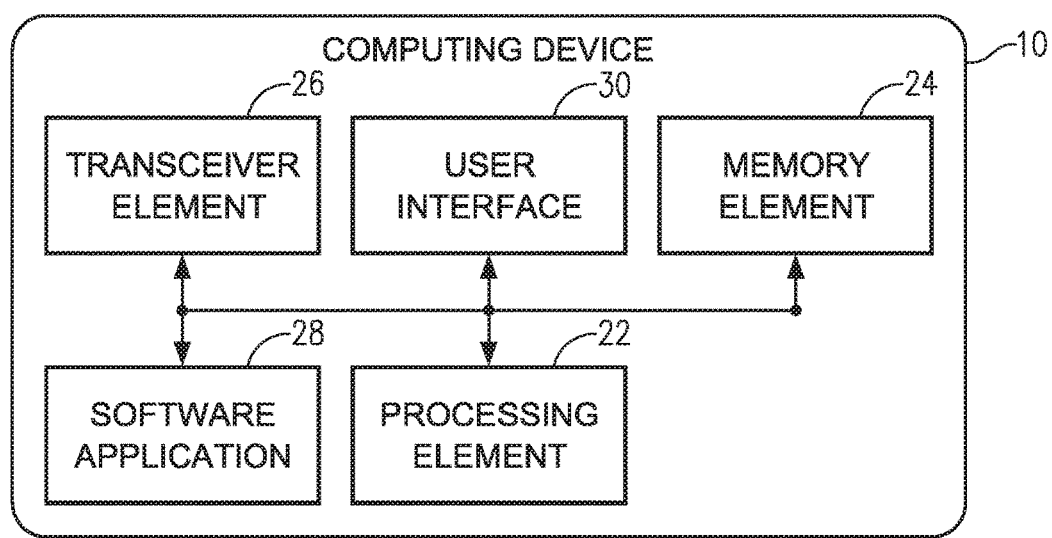
FIGS. 2 and 3 illustrate various components of exemplary computing devices shown in block schematic form that may be used with the system of FIG. 1.
Figure 3:
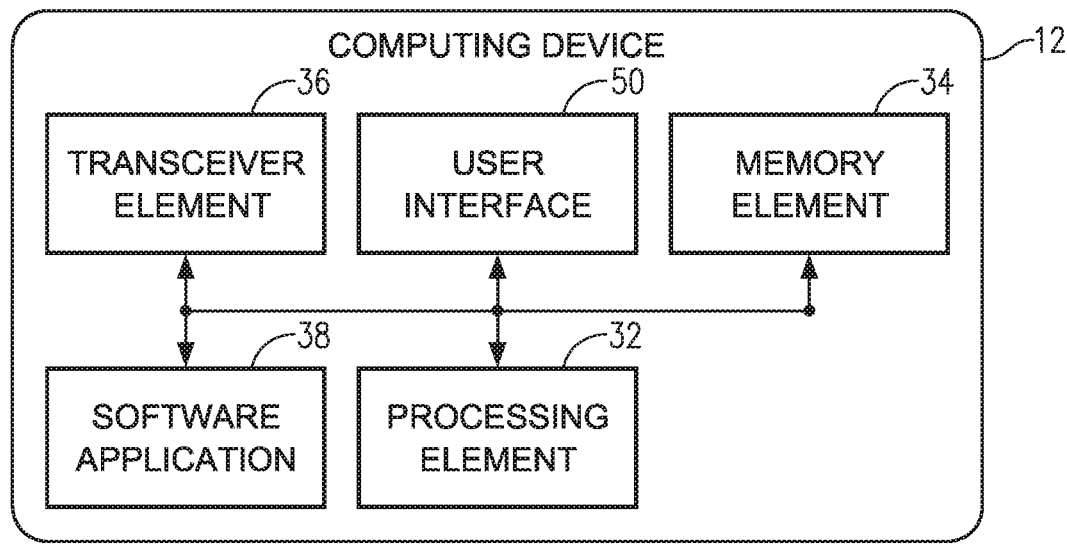

Turning to FIGS. 2-3, generally the computing devices 10, 12 may include tablet computers, laptop computers, desktop computers, workstation computers, smart phones, smart watches, and the like. In addition, the computing devices 10, 12 may include copiers, printers, routers and any other device that can connect to the communication network 18. Each computing device 10, 12 may respectively include a processing element 22, 32 and a memory element 24, 34. Each computing device 10, 12 may also respectively include circuitry capable of wired and/or wireless communication with the communication server 20 and/or the communication network 18, including, for example, transceiver elements 26, 36. Further, the computing devices 10, 12 may respectively include a software application 28, 38 configured with instructions for performing and/or enabling performance of at least some of the steps set forth herein. In an embodiment, the software applications 28, 38 comprise programs stored on computer-readable media of memory elements 24, 34. Still further, the computing devices 10, 12 may respectively include a user interface 30, 50.

Figure 4:
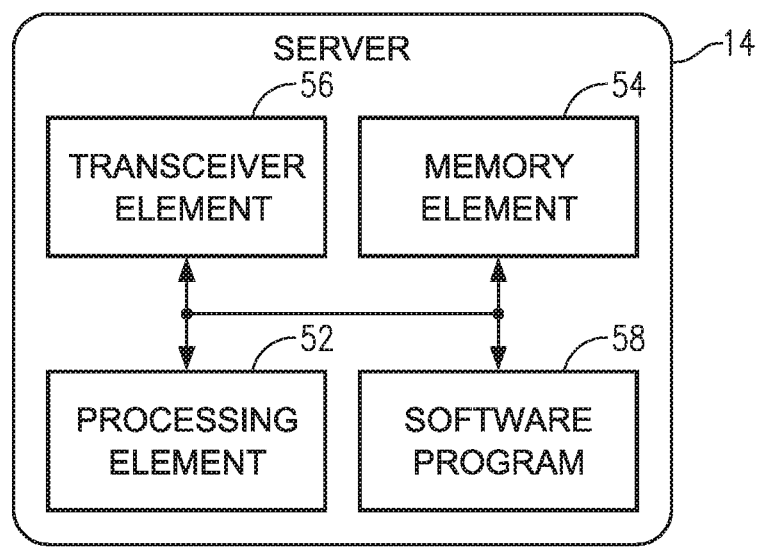
FIG. 4 illustrates various components of an exemplary server shown in block schematic form that may be used with the system of FIG. 1.

The servers 14 may be used for communication, processing, or generally implementing a platform for executing tests, and/or for performing related functions. The servers 14 may retain electronic data and may respond to requests to retrieve data as well as to store data. The servers 14 may comprise domain controllers, application servers, database servers, file servers, mail servers, catalog servers or the like, or combinations thereof. Generally, each server 14 may include a processing element 52, a memory element 54, a transceiver element 56, and a software program 58, as shown in FIG. 4. In some embodiments, one or more servers 14 may comprise or support a Citrix® cloud service that executes tests received from the one or more database servers 16.

Figure 5:
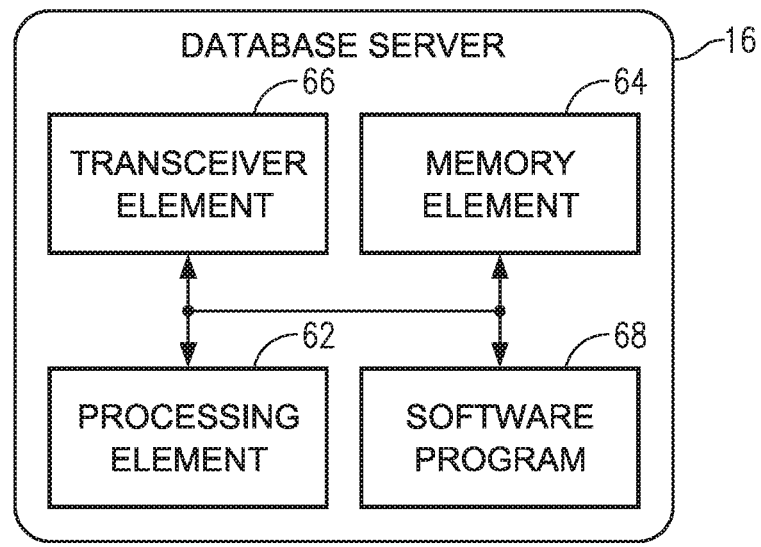
FIG. 5 illustrates various components of an exemplary database shown in block schematic form that may be used with the system of FIG. 1.

The database servers 16 may generally be used for storing data, tests, variable value protocols, variables, and data related thereto. The database servers 16 may be servers devoted to database applications, such as a database server, and may include software applications stored thereon configured to categorize, organize, and/or store data. Generally, each database server 16 may include a processing element 62, a memory element 64, a transceiver element 66, and a software program 68, as shown in FIG. 5. For example, one or more database servers 16 may utilize Redis™ as its software program 68, which may be configured for receiving and storing tests to be executed by one or more servers 14. One or more database servers 16 may also include an Apache™ software program 68, including a queue database program such as CouchDB® for storing tests, variable value protocols, variables, automation scripts, pre-defined conditions, etc.

The communication network 18 generally allows communication between the computing devices 10, 12, servers 14, database servers 16, and the communication server 20. The communication network 18 may include the Internet, cellular communication networks, local area networks, metro area networks, wide area networks, cloud networks, plain old telephone service (POTS) networks, and the like, or combinations thereof. The communication network 18 may be wired, wireless, or combinations thereof and may include components such as modems, gateways, switches, routers, hubs, access points, repeaters, towers, and the like. The computing devices 10, 12, servers 14, database servers 16, and/or communication server 20 may, for example, connect to the communication network 18 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The transceiver elements 26, 36, 56, 66 generally allow communication between the computing devices 10, 12, the servers 14, the database servers 16, the communication server 20, and the communication network 18. The transceiver elements 26, 36, 56, 66 may include signal or data transmitting and receiving circuits, such as antennas, amplifiers, filters, mixers, oscillators, digital signal processors (DSPs), and the like. The transceiver elements 26, 36, 56, 66 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the transceiver elements 26, 36, 56, 66 may utilize communication standards such as ANT, ANT+, Bluetooth™ low energy (BLE), the industrial, scientific, and medical (ISM) band at 2.4 gigahertz (GHz), or the like. Alternatively, or in addition, the transceiver elements 26, 36, 56, 66 may establish communication through connectors or couplers that receive metal conductor wires or cables, like Cat 6 or coax cable, which are compatible with networking technologies such as ethernet. In certain embodiments, the transceiver elements 26, 36, 56, 66 may also couple with optical fiber cables. The transceiver elements 26, 36, 56, 66 may respectively be in communication with the processing elements 22, 32, 52, 62 and/or the memory elements 24, 34, 54, 64.

The memory elements 24, 34, 54, 64 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 24, 34, 54, 64 may be embedded in, or packaged in the same package as, the processing elements 22, 32, 52, 62. The memory elements 24, 34, 54, 64 may include, or may constitute, a "computer-readable medium." The memory elements 24, 34, 54, 64 may store the instructions, code, code segments, software, firmware, programs, applications, apps, services, daemons, or the like that are executed by the processing elements 22, 32, 52, 62. In an embodiment, the memory elements 24, 34, 54, 64 respectively store the software applications/program 28, 38, 58, 68. The memory elements 24, 34, 54, 64 may also store settings, data, documents, sound files, photographs, movies, images, databases, and the like.

The processing elements 22, 32, 52, 62 may include electronic hardware components such as processors. The processing elements 22, 32, 52, 62 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 32, 52, 62 may generally execute, process, or run instructions, code, code segments, software, firmware, programs, applications, apps, processes, services, daemons, or the like. For instance, the processing elements 22, 32, 52, 62 may respectively execute the software applications/program 28, 38, 58, 68. The processing elements 22, 32, 52, 62 may also include hardware components such as finite-state machines, sequential and combinational logic, and other electronic circuits that can perform the functions necessary for the operation of the current invention. The processing elements 22, 32, 52, 62 may be in communication with the other electronic components through serial or parallel links that include universal busses, address busses, data busses, control lines, and the like.

Figure 6:
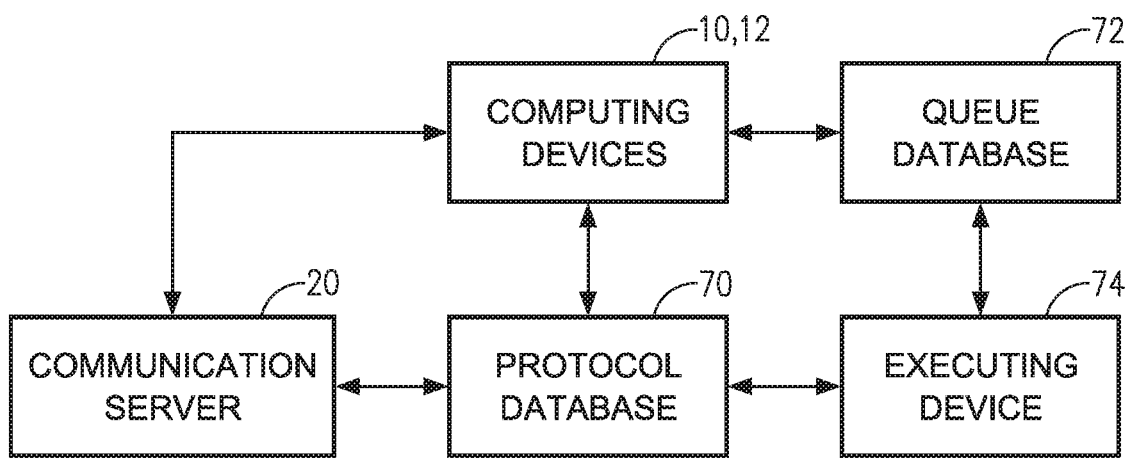
FIG. 6 is a flowchart of various components of an exemplary system for defining and initiating a test for a software application.

Turning to FIG. 6, a system according to an embodiment of the present invention includes a protocol database 70, computing devices 10, 12 in communication with the protocol database 70, a queue database 72 in communication with the computing device 10, an executing device 74 in communication with the queue database 72 and the protocol database 70, and a communication server 20 in communication with the protocol database 70 and computing devices 10, 12. One or more of the database servers 16 may embody the test protocol database 70 for storing variable value protocols, variables associated with the variable value protocols, source code of versions of software applications, automation scripts, pre-defined conditions associated with the variables, scenarios, and information associated therewith. The information associated with the variable value protocols, variables, automation scripts, pre-defined conditions, and scenarios may include related metadata such as identifiers indicating version, creation date, revision date, etc.

An automation script may encode one or more scheduled responses to prompts from a tested software application. Each prompt of a software application may be a request for a value of a particular variable. A variable may represent an input value the software application may require, and may have an associated pre-defined condition.

Pre-defined conditions associated with variables of a variable value protocol may be any limitation, algorithm, formula, class, or the like, or combinations thereof, that the variable, and more particularly values corresponding to the variable, must conform with and/or satisfy. Each variable may have one or more pre-defined conditions associated with it. Each set of pre-defined conditions may be associated with an input variable and stored in the test protocol database 70. A class may include broad or specific categories, depending on the diversity of the values required by the one or more software applications. For instance, a class may be a number or series of numbers, such as a rational number for a scalar quantity or a series of numbers representing a date. For another example, the class may be a general word class, or may be a specific class, such as a name, vehicle type, vehicle make, etc. In an exemplary use case, if a pre-defined condition of a variable comprises a requirement for a value in a word string class, the value provided for the variable may be forced to comprise one or more words to conform with the pre-defined condition. Moreover, the pre-defined conditions may define ranges, sub-ranges and/or other boundaries for values of input variables.

In an embodiment, a pre-defined condition may also or alternatively be determined from and/or inherent in the instructions of an automation script incorporating the relevant variable. For example, the automation script may specify one or more aspects of a permissible value for a variable (i.e., pre-defined conditions), and a corresponding variable value protocol may include a value for the variable. The executing device 74 and/or computing device 10 may be configured to check the value from the variable value protocol against the specifications of the automation script to determine conformance or non-conformance therewith.

Alternatively or additionally, the pre-defined conditions may otherwise be stored separately from the automation scripts and may provide information associated with the pre-defined conditions (i.e., pre-defined condition metadata) to the computing device 10 (e.g., executing device 74) upon request.

Information associated with a pre-defined condition may include revision dates of the pre-defined condition and/or an indicator that the pre-defined condition was recently revised. A value submitted by the automation script for a variable is preferably consistent with corresponding pre-defined conditions; however, it is foreseeable that in some instances the value may be inconsistent, and the computing device 10 (e.g., the executing device 74) may throw an error and/or may revise the value into conformance with the pre-defined conditions, and may automatically generate a user notification regarding the performance of such operation(s).

The automation script may be designed to test any portion of a software application, including a single input and the resulting response (or output) of the application. The automation script may also be designed to test the entirety of the software application, for example where every possible scenario is tested. The automation script automatically provides a value for an input variable when prompted by the tested software application in order to determine an output of the software application due at least in part to the inputted value of the input variable. The automation script may include a launch point (a particular prompt of the software application to begin providing responses), input variables having corresponding values, configuration text files, etc.

The automation script may also receive values for the input variables from one or more variable value protocol(s). Each value may be manually inputted, or defined, by a test manager when creating the variable value protocol. If a value is not manually defined or is underdefined (e.g., where pre-defined conditions are provided to partly define the value(s), but have not been resolved to a test data manually and/or via the data fabrication engine yet), the value may be generated by a data fabrication engine. The data fabrication engine may be any data fabrication engine known in the art that automates the generation of useful, synthetic data for testing purposes, the generated values conforming to one or more pre-defined conditions governing the types of valid values required for use with one or more variables of the tested software application(s).

The data fabrication engine may be a random or pseudo-random value generation program configured to access and observe one or more pre-defined conditions (e.g., rules) for generating corresponding values of input variables. For instance, where a pre-defined condition or rule requires a value for an input variable that is an integer between one (1) and ten (10), the data fabrication engine may utilize a random or pseudo-random selection process to generate the number three (3). It is foreseen that various known software for generating random or semi-random values and/or strings or the like may be employed without departing from the spirit of the present invention. For example, several tools for generating test data—such as the test data fabrication tool offered by International Business Machines Corporation under INFO SPHERE OPTIM™ as of the date of initial filing for this disclosure—may be utilized in embodiments of the present invention.

A variable value protocol may define a value for one or more input variables. The variable value protocol may include at least one pre-defined condition for one or more input variables. All or some of the value(s) and pre-defined condition(s) may be utilized for tests of multiple versions of a software application. Further, variables, values and/or pre-defined conditions may be used in multiple variable value protocols to test a plurality of software applications.

A "test" may comprise execution of at least a portion of a software application using an automation script to observe the software application's performance and/or output in response to received value(s) representing one or more variable(s) provided by the automation script, the value(s) being defined by the variable value protocol and/or the data fabrication engine. A "scenario" may refer to a particular path the application takes through execution of a test—from start to finish—based at least in part on the values provided by the automation script.

In an embodiment, the test protocol database 70 may be configured to store results from tests of previous versions of software applications, for example where the results may be attributable at least in part to an input variable. The results may include output variations comprising data describing and/or evidencing differences in output between two or more versions of an application that may be attributable, at least in part, to those versions' different treatment of an input variable. For instance, an input variable may be entitled number pets total by a software application developer. A first version of a software application executed with a corresponding automation script may prompt the automation script for a value corresponding to the variable, and may receive a value of "5" from the automation script (according to a variable value protocol). The first version may generate a first output comprising instructions to display the following text at a user interface: "The number of pets entered violates a maximum value." In turn, a second version of the software application may be executed by the automation script, and may prompt the automation script for a value corresponding to the variable set out above. The automation script may reference the variable value protocol and accordingly submit the value of "5" substantially as outlined in connection with testing of the first version. However, the second version may generate another prompt relating to a different variable in response to entry of the value "5," which comprises an output variation between the two versions at least partly attributable to the variable number pets total. The output variation may be flagged and the corresponding results (e.g., variable name; differing outputs; application, automation script and variable value protocol version(s); etc.) may be saved to the test protocol database 70.

The test protocol database 70 may also or alternatively be configured to store data describing and/or evidencing differences in a pre-defined condition applicable to a variable between two or more versions of an application. This may enable provision of an automated notification to the test manager regarding whether the pre-defined condition of the variable has changed since the last execution of a test. The notification may be provided when the test manager is building or modifying a test, for example in response to selection of a variable value protocol associated with the software application and/or in response to selection of the variable for manual definition. This provides fuller context and enables the test manager to be better informed when building a test. The test protocol database 70 may receive the results and/or information about pre-defined condition variations from the computing device 10 and/or the executing device 74. The computing device 10 and/or the executing device 74 may be configured to retrieve these results.

The computing device 10 may be configured to retrieve variable value protocols and the like from the test protocol database 70. The computing device 10 may be configured to modify the variable value protocols, scenarios, variables, and information related thereto to generate one or more tests to be executed. For example, the computing device 10 may be configured to display representations of a plurality of variable value protocols, scenarios, and/or tests accessed from the test protocol database 70 on the user interface 30. The computing device 10 may be configured to receive a selection of one of the tests, automation scripts, variable value protocols, scenarios, and/or an instruction to create a new variable value protocol via the user interface 30. The computing device 10 may be configured to display representations of the tests, scenarios, and/or variable value protocols and variables associated with them and selections thereof on the user interface 30. The computing device 10 may be configured to receive manually-inputted values for defining specific variables of the tests, scenarios, and/or variable value protocols via the user interface 30. Some variables may be automatically generated by and received from the data fabrication engine. For example, variables not defined manually within a variable value protocol may automatically receive their values from the data fabrication engine in conjunction with execution of a test.

In some embodiments, the computing device 10 may be configured to—in conjunction with test building processes of the test manager—automatically verify that the values being manually defined and/or the parameters and the like provided to the data fabrication engine for generation of the values are consistent with corresponding pre-defined conditions defined in the automation script. In an embodiment, the computing device 10 may be configured to automatically check the test protocol database 70 for data regarding changes to pre-defined conditions corresponding to one or more of the variables of the variable value protocol under construction. The computing device 10 may be configured to automatically verify these values and/or check for changes to relevant pre-defined conditions upon receipt; upon selection of a pre-existing variable value protocol, scenario, and/or test; and/or upon selection of a variable. The computing device 10 may also be configured to automatically verify these values and/or check for changes to relevant pre-defined conditions intermittently, such as after various time intervals. The computing device 10 may be configured to automatically display any relevant pre-defined conditions so that the test manager can make informed decisions when defining the variables.

In some embodiments, a software application developer may make revisions to pre-defined conditions at computing device 12, and save data related to the revisions on the test protocol database 70. For example, pre-defined condition revision records keyed to unique variable names may be stored in the test protocol database 70 in chronological order. Such records may include data regarding software application version, changes made, and the like. The computing device 10 may be configured to automatically check the revisions records relating to pre-defined conditions for variables in the test protocol database 70 whenever those variables are implicated by the test manager, such as upon selection of a corresponding variable value protocol, scenario, or test utilizing the variables. The computing device 10 may also be configured to display such records, such as when the corresponding variable is selected and/or manually defined. It is foreseen that the computing device 10 may be configured to verify these values and/or check for changes to relevant pre-defined conditions in any number of manners without departing from the spirit of the present invention.

In an embodiment, the computing device 10 may be configured to automatically retrieve a record regarding an output variation from the test protocol database 70 when the computing device 10 receives a selection of its corresponding input variable. In such an embodiment, the computing device 10 may also be configured to automatically display the output variation. When displaying the output variation, the computing device 10 may be configured to merely state a change has been made to a pre-defined condition of the relevant variable, or the computing device 10 may be configured to state the nature and specific details of the change. In an embodiment, the computing device 10 may automatically receive output variations from the test protocol database 70 via the communication server 20 and display the output variation(s) so that test managers may be aware of them. This may serve as an indicator to the test managers that a variable related to a selected variable, variable value protocol, scenario, software application, and/or test has experienced a change in a pre-defined condition.

In the example outlined above, the output variation discovered between first and second versions of the software application receiving a value for number pets total may be stored in and/or cross-referenced to a pre-defined condition change record of the test protocol database 70. That is, the executing device 74 (or another device in communication with the test protocol database 70) may be configured to automatically flag output variations indicating a change in a pre-defined condition for association with a pre-defined condition change record. In the example, because the output from the first version of the software application in direct response to a number value input included the words "violate[ ] . . . maximum value", the executing device 74 may utilize automated parsing techniques and rules to recognize the aforementioned words and flag the variation as relating to a pre-defined condition change.

One of ordinary skill will appreciate that any number of techniques for identifying and/or classifying output variations and/or pre-defined condition changes may be employed without departing from the spirit of the present invention. For example, an automation script—corresponding to two versions of a software application—may be automatically checked to identify changes to a pre-defined condition applicable to a variable. An exemplary method of checking for changes of an automation script may include determining whether the latest revision date of the automation script is after a release date of the latest version of the software application. The identified changes may be stored in the test protocol database 70 substantially as outlined above.

The computing device 10 may also be configured to display an indicator on the user interface that indicates when the output variation and/or change in pre-defined condition was detected in a test and/or otherwise identified. The indicator may include a temporal indicator, such as a date on which the variation/change was identified or an elapsed time since identification. The indicator may also include a proximity indicator, indicating, for example, how many times the corresponding software application was tested following detection of the variation/change. It is foreseen that any number and/or types of indicators may be used that would provide the test manager contextual information regarding potential version differences in the software application, variable value protocol, automation script, scenario, and/or test without departing from the spirit of the present invention. Additionally or alternatively, the computing device 10 may be configured to automatically retrieve an output variation and/or change in a pre-defined condition from the test protocol database 70 when the computing device 10 modifies a variable value protocol or receives a selection of a variable value protocol. The computing device 10 may be configured to automatically display a relevant pre-defined condition and/or changes thereto. This enables tests to be generated that account for both newer versions of a software application to be tested and revisions to pre-defined conditions related to the software application. This improves the functioning and efficiency of a test system so that fewer tests may be executed by the executing device 74, instead of having to create enough tests to control for the multitudinous versions of the pre-defined conditions, variable value protocols, tests, software applications, etc.

It is also foreseen that output variations and/or changes in pre-defined conditions may occur between versions of a software application that are not automatically recognizable as being at least partly attributable to a variable. While the automation script and/or software application version source code may be parsed to determine the variables considered in the underlying logic of the software application when generating an output that has varied, it is possible that the software application may call a routine or module that cannot be parsed. In such circumstances, a corresponding output variation may be recorded (along with useful metadata for providing context) and flagged for manual review.

One or more of the database servers 16 may embody the queue database 72 and be in communication with the computing device 10. The queue database 72 may be configured to receive, categorize, organize, and/or store the one or more tests, variable value protocols, and/or scenarios from the computing device 10. The one or more tests, variable value protocols, and/or scenarios may include modified or original versions thereof. The queue database 72 may be configured to submit the various tests, scenarios, and/or test protocols to the executing device 74 in a first-in-first-out order corresponding to timing of receipt by the queue database 72. However, it is foreseeable that various ordering protocols may be employed without departing from the spirit of the invention. For example, the various tests, scenarios, and variable value protocols may be assigned priorities weighted by importance of the corresponding software applications to be tested, the size of the tests, the source of the tests, etc.

One or more of the servers 14 may embody the executing device 74 and may be configured to retrieve from the queue database 72 the tests, variable value protocols, and/or scenarios to be executed, retrieve from the test protocol database 70 automation scripts and/or pre-defined conditions for variables of variable value protocols involved in the tests. The executing device 74 may further be configured to execute corresponding tests using the variable value protocols and automation scripts. The executing device 74 may be configured to store information related to the execution of the tests on the test protocol database 70. It should be noted that the queue database 72 and test protocol database 70 may comprise the same database in some embodiments, and/or may alternatingly serve as storage centers for the information outlined throughout this disclosure, without departing from the spirit of the present invention.

In an embodiment, the executing device 74 may be configured to retrieve a version of a variable value protocol from the queue database 72 and a version of an automation script associated with that version of the variable value protocol from the test protocol database 70. The executing device 74 may also retrieve results from a previous version of the software application due to an input variable represented in the same version of the variable value protocol using the same version of the automation script from the test protocol database 70. The executing device 74 may test the variable value protocol using the associated automation script to generate a second set of results. The executing device 74 may compare the second results against the first (retrieved) results. The comparison may include comparison of outputs due at least in part to an input variable of the variable value protocol to determine a corresponding output variation. The executing device 74 may be configured to store the output variation on the test protocol database 70 in association with metadata identifying the previous version of the software application, the current version of the software application, the version of the variable value protocol, and the version of the automation script. As outlined above, the executing device 74 may also automatically parse or otherwise analyze the output variation according to one or more rules to determine whether the corresponding record should be flagged as being indicative of a pre-defined condition change.

In an embodiment, the executing device 74 may also or alternatively be configured to access a separate database server storing pre-defined conditions. The executing device 74 may automatically analyze any variables from variable value protocols, scenarios, and/or the automation scripts to determine whether the values of the variables satisfy various pre-defined conditions.

The communication server 20 may automatically access the test protocol database 70 to retrieve the information related to the execution of the tests, variable value protocols, and/or scenarios—and, more particularly, to output variations and/or changes in pre-defined conditions identified through the automated processes outlined hereinabove—and provide that information to the test management computing device 10 and/or developer computing device 12, e.g., in the form of notifications at one or more user interface(s).

Exemplary Test Development Interface

Figure 7:
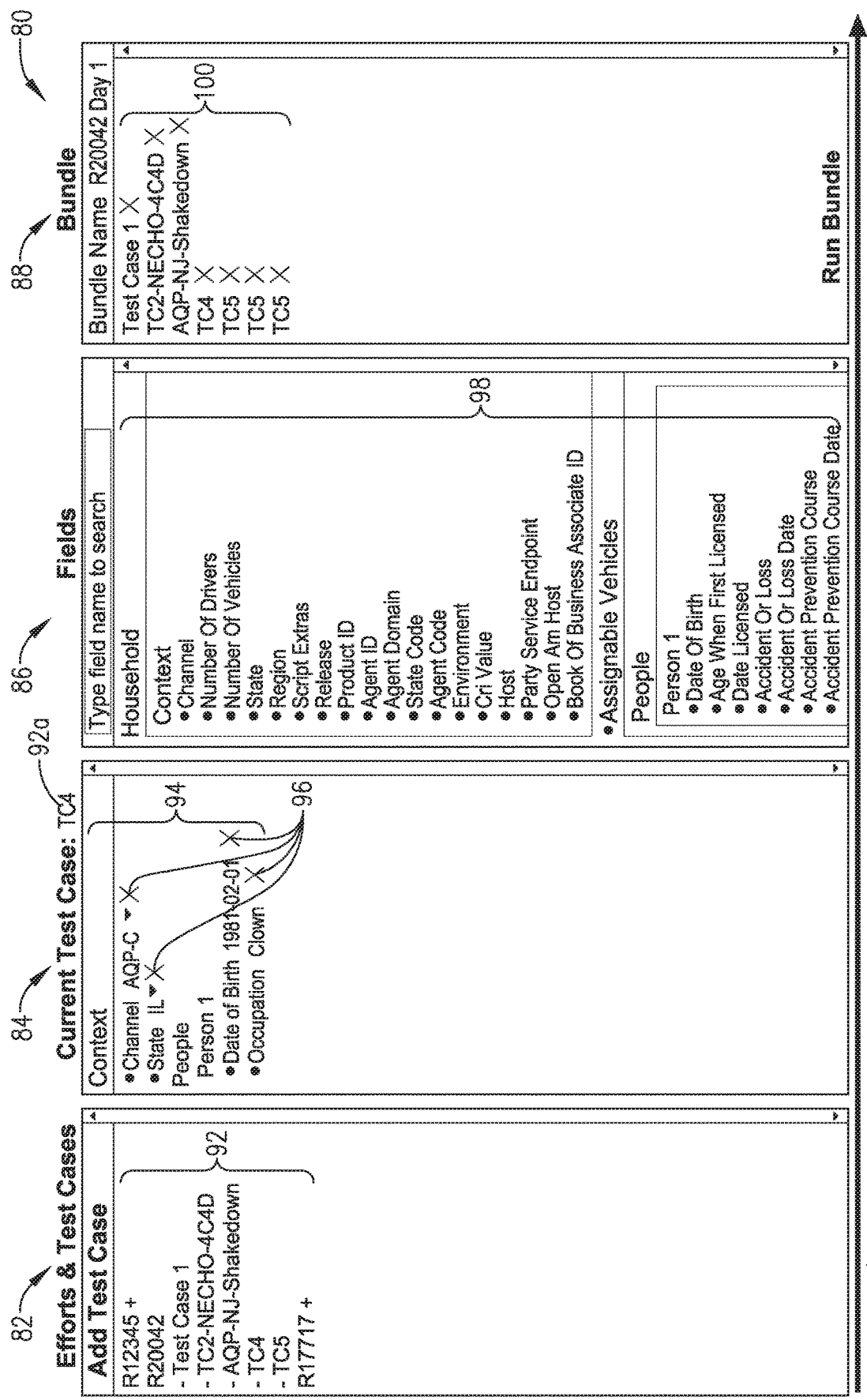
FIG. 7 illustrates various components of a test development interface for at least partly defining a test for a software application, in accordance with embodiments of the present invention.

FIG. 7 depicts an exemplary test development interface 80 for use in developing variable value protocols for execution against software applications by corresponding automation scripts. The interface 80 may include a variable value protocol section 82, a selected variables section 84, an all-variables section 86, and a bundle section 88. The sections 82, 84, 86, 88 may be displayed along a horizontal axis 90 on one or both of user interfaces 30, 50 of computing devices 10, 12. However, it is foreseen that the interface 80 may have more or fewer sections (while still displaying the information outlined herein) without departing from the spirit of the present invention. A section may include a region of a user interface that is bounded using visible boundaries, for example as embodied by separate windows of a browser, separate tabs of a single window of a browser, boundary-delineated portions of a single window and tab, or the like. The interface 80 may be implemented via the software application 28. One of ordinary skill will appreciate that the interface 80 may be configured to receive and/or display selections and/or values inputted via various I/O devices—such as a keyboard, mouse, touch-screen display or the like—without departing from the spirit of the present invention.

The test development interface 80 may display a notification and/or indication that one or more manually-inputted values and/or values from the data fabrication engine (e.g., where the software application 28 includes instructions for generation of the values by the data fabrication engine coincident with test development at the interface 80) are consistent with respective pre-defined conditions. Such indication(s) may additionally or alternatively signify that a pre-defined condition related to one or more variables represented in a variable value protocol have been revised. The development interface 80 may be configured to also display the relevant pre-defined condition and/or revisions thereto.

The computing device 10 may be configured to display the indication continuously, intermittently, and/or upon a triggering event. The triggering event may be a selection of a variable value protocol, a selection of a scenario, a selection of a selectable variable, a reception of a manually-inputted value and/or a value from a data fabrication engine, and/or a designation of a variable value protocol for use in a test. In an embodiment, the computing device 10 may be configured to perform the verification and direct the interface 80 to display the appropriate indication. Alternatively or additionally, the executing device 74 may be configured to perform the verification and transmit the results to the test protocol database 70. The computing device 10 may be configured to automatically access the verification results via the communication server 20 and display the results on the interface 80.

The one or more computing devices 10 may be configured to access and retrieve the variable value protocols 92 and associated data from the test protocol database 70. The one or more computing devices 10 may be configured to display representations (e.g., titles) of the retrieved variable value protocols 92 on the variable value protocol section 82. Each variable value protocol 92 may be associated with a plurality of variables. The plurality of variables may include a set of one or more selected variables and a set of one or more selectable variables. The selected variables may be manually-selected and defined, and stored on the test protocol database 70 in association with one or more of the variable value protocols 92. The variable value protocol section 82 may be configured to receive selection of a selected variable value protocol 92a. Additionally or alternatively, the variable value protocol section 82 may be configured to receive an instruction to create a new variable value protocol 92.

The selected variables section 84 may be configured to display at least one set of selected variables 94 associated with the selected variable value protocol 92a. The selected variables section 84 may also be configured to receive and/or display manually-inputted values 96 for at least a portion of the one or more selected variables 94 corresponding to the selected variable value protocol 92a.

The selected variables section 84 may be configured to display a notification when one of the manually-inputted values 96 is inconsistent with a pre-defined condition and/or when a pre-defined condition applicable to that value has been revised, in accordance with the discussion above. In an embodiment, if a value is inconsistent with one or more pre-defined conditions, it may be automatically revised. For example, if a variable has a pre-defined condition requiring an integer value, and a decimal value is given, an executing device may be configured to round the decimal value to the nearest integer value. Each pre-defined condition may be retrieved by the computing device 10, for example, from the test protocol database 70 for comparison against a corresponding manually-inputted value 96. Each selected variable 94 may have one or more pre-defined conditions associated with it.

The all variables section 86 may be configured to display a set of selectable variables 98 of the selected variable value protocol 92a. It should be noted that other variables—i.e., those not made imminently available for selection—may be defined by the selected variable value protocol 92a and yet not be displayed in the all variables section 86. The all variables section 86 may be configured to receive a selection of one of the selectable variables 98. Upon selection of one of the selectable variables 98, the interface 80 may be configured to display the selected selectable variable 94 in the selected variables section 84. In an embodiment, the computing device 10 may be configured to receive from a data fabrication engine values for the unselected selectable variables 98 and display the values in the all variables section 86 in association with corresponding selectable variables 98. The all variables section 86 may include the indicator discussed above that indicates whether the values received from the data fabrication engine are consistent with pre-defined conditions and/or whether such pre-defined conditions have recently been revised.

In an embodiment, the computing device 10 may be configured to facilitate a drag-and-drop feature of the interface 80 whereby a test manager may select a variable value protocol 100 from the variable value protocol section 82 and drag it to the bundle section 88. The bundle section 88 may display the received variable value protocol 100 to represent scheduling of a test using the variable value protocol 100. The computing device 10 may also initiate the test directly and/or through transmission to the queue database 72, for example upon a triggering event such as passage of a pre-determined period of time, the end of a user session, confirmation input received from the test manager, etc.

By displaying the variable value protocols 92, selected variables 96, selectable variables 98, scheduled variable value protocol(s) 100, and/or the indication(s) and notification(s) regarding same on the interface 80, the test manager is provided with valuable context for building and initiating test(s) to be executed.

Figure 8:
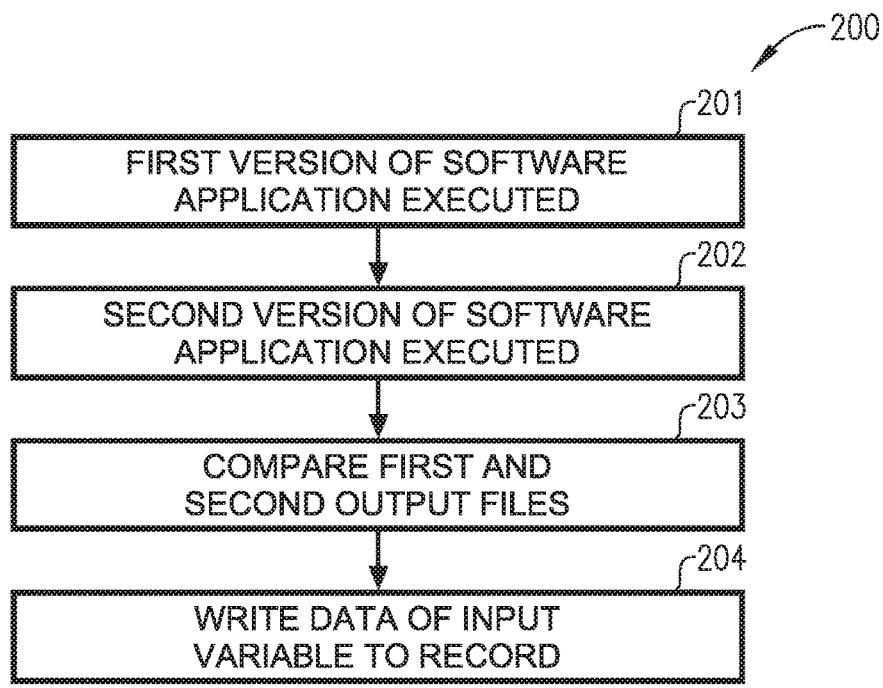
FIG. 8 is a flowchart illustrating at least a portion of the steps for automatic version tracking of tested software applications in accordance with embodiments of the present invention.

Exemplary Method for Automatic Version Tracking of a Software Application Undergoing Tests FIG. 8 depicts a flowchart including a listing of steps of an exemplary computer-implemented method 200 for version tracking of a software application to identify variations in treatment of an input variable. The steps may be performed in the order shown in FIG. 8, or they may be performed in a different order. Furthermore, some steps may be performed concurrently as opposed to sequentially. In addition, some steps may be optional.

The computer-implemented method 200 is described below, for ease of reference, as being executed by exemplary devices and components introduced with the embodiments illustrated in FIGS. 1-7. For example, the steps of the computer-implemented method 200 may be performed by the computing devices 10, 12, the servers 14, the database servers 16, the network 18, and the communication server 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 201, a first version of the software application may be automatically executed, via an executing device such as the computing device 10 and/or the executing device 74 and using a corresponding automation script and a variable value protocol, to generate a first output file. The first output file may include outputs of the tested software application at least partly attributable to one or more input variables. For example, the output may include instructions of the software application for display of text in response to receipt of a value for an input variable, as discussed in examples above. The text may be recorded in the output file in association with the input variable(s) at least partly responsible for generation of the text.

The output file may also include metadata associated with the variable value protocols, scenarios, tests, variables, automation scripts, pre-defined conditions, and their versions, creation dates, revision dates, etc. In some embodiments, multiple tests based on multiple variable value protocols and/or multiple cycles of value acquisition from a data fabrication engine (based on a single variable value protocol) may be tested against the first version of the software application, with a separate output file being generated and stored in each such instance.

Referring to step 202, a second version of the software application may be automatically executed using the automation script and the variable value protocol to generate a second output file. The test of the second version of the software application may be automatically executed before, concurrently, or after the first version of the software application. Any metadata related to the at least one variable value protocol may be received and analyzed. For example, the version identifier of the variable value protocol used to execute the first version of the software application may be compared to the version identifier of the variable value protocol used to execute the second version of the software application. Any detected discrepancy between any data or metadata related to the variable value protocols and/or the versions of the software applications, etc. may be noted. Additionally, the computing devices 10 and/or executing device 74 may be configured to display the discrepancy as an indicator on the interface 80.

In an embodiment, the automation script associated with the first version of the software application is compared with the automation script associated with the second version of the software application to ensure that the automation scripts are the same or are consistent. Any discrepancy may be noted and displayed on a user interface. In another embodiment, the same or similar sets of values that were submitted during testing of the first version of the application (and discussed above) may be submitted in tests of the second version of the application—using the same or consistent automation script—so as to generate a corresponding plurality of output files.

Referring to step 203, the first output file and the second output file may be automatically compared to identify an output variation between the first output file and the second output file attributable to at least one input variable. The comparison may occur at any point during the execution of the software applications. For example, the versions may be tested concurrently, and a running comparison of respective output files may automatically identify variations as the tests are executed. For another example, the output files may be compared after tests have been completed and complete output files have been stored.

Additionally or alternatively, the output files may be stored and made accessible to a user for manual comparison. The output files may include an indication of the input variable attributable to the output variation. In embodiments where the input variable attributable to the output variation is not automatically identified, the output files may be displayed in a manner showing each output and corresponding input variable(s). For example, a table may be displayed having a column listing input variables, a column listing outputs from the first output file, and a column listing outputs from the second output file. In the table, the outputs attributable to an input variable may be displayed on the same row of the table. In embodiments that identify an input variable that contributes to an output variation, such an input variable may have some indicator, such as a highlight, an asterisk, etc. It is foreseen that the output files may be displayed in any number of ways without departing from the spirit of the present invention.

Referring to step 204, data representing each input variable at least partly responsible for an output variation may be written to a record in response to the identification of the output variation(s). The data representing each input variable may include the corresponding outputs from the output files, pre-defined conditions related to the input variable, the automation script and/or variable value protocol used to execute the first and second versions of the software application, metadata related to these items, and/or any other relevant information for determining the reasons for the output variation. The comparison of the output files may alternatively end as soon as one variation is detected. In such a configuration, the computing devices 10 and/or the executing device 74 may be configured to immediately provide a notification of the output variation, and to write the record relating to the variation substantially as outlined above. The notification may include the data representing the responsible input variable(s) and other relevant information, such as an analysis of how and why the variation occurred, other input variables that may have contributed, and other automatically-generated information or the like. The notification may be displayed on the interface 80.

The method may include additional, less, or alternate steps and/or device(s), including those discussed elsewhere herein. For example, in some embodiments, the first output file and the second output file may be stored in association with metadata identifying the first version of the software application, the second version of the software application, a version of the at least one variable value protocol, and a version of the automation script. Further, a pre-defined condition related to the at least one variable value protocol may be automatically received from a database server 16 having one or more pre-defined condition. In some embodiments, such a database server 16 may include the test protocol database 70. The pre-defined condition may be stored in association with a revision of the pre-defined condition and the input variable. The revision to the pre-defined condition may automatically be displayed so that a manager may be notified of revisions related to an input variable. The pre-defined condition may be displayed intermittently or upon a triggering event, such as a selection of a variable value protocol having a variable corresponding to the pre-defined condition, receipt of a manually-inputted value for the variable, etc.

Exemplary System for Building and Initiating Tests for Software Applications

Figure 9:
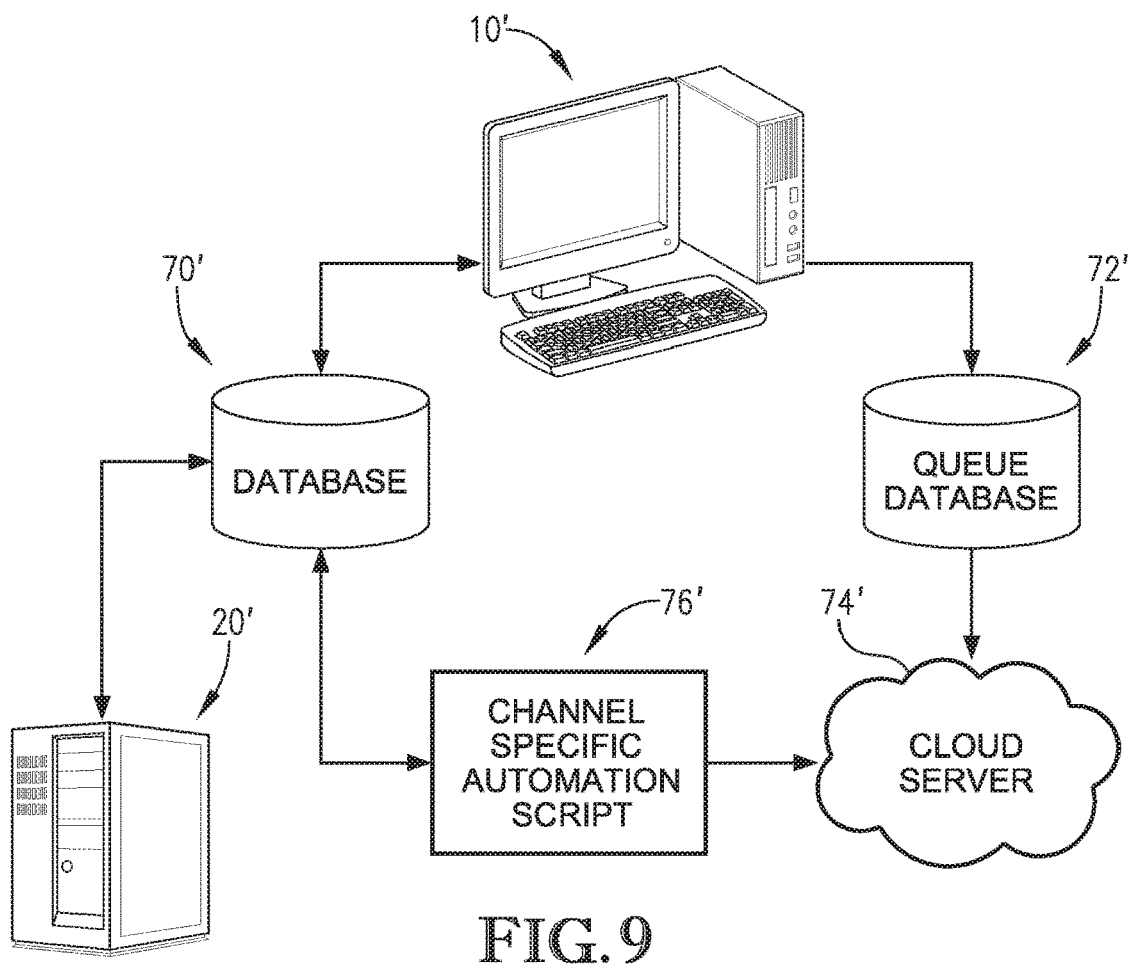
FIG. 9 is a flowchart of various components of an exemplary system for defining and initiating a test for a software application.

FIG. 9 depicts an exemplary system for developing and initiating tests for software applications according to embodiments of the present invention. The system may include a test protocol database 70', computing device 10', queue database 72', executing device or cloud server 74', and communication server 20'.

The test protocol database 70' may be substantially similar to the test protocol database described above and be configured to receive from the computing device 10' one or more scenarios and to save the scenarios thereon. The scenarios may be comprised of one or more variable value protocols and automation scripts as discussed above.

The computing device 10' may be substantially similar to the computing device 10 above and be in communication with the test protocol database 70'. The computing device 10' may be configured to retrieve one or more scenarios from the test protocol database 70'. The computing device 10' may be configured to receive various instructions to modify the one or more scenarios. For example, the computing device 10' may be configured to display one or more scenarios, including variable value protocols, selectable variables of the variable value protocols, selected variables of the variable value protocols, and the values corresponding to the selected variables. The computing device 10' may also be configured to receive an instruction to generate a new scenario and/or variable value protocol. The computing device 10' may be configured to receive a selection of a variable value protocol, a selectable variable, and/or a selected variable. The computing device 10' may receive values in association with the selected variables. Once a test manager has completed building/modifying one or more scenarios, the computing device 10' may be configured to save one or more scenarios to the test protocol database 70'. The computing device 10' may also receive instructions to test a selected scenario. When computing device 10' has received instructions to test a selected scenario, the computing device 10' may be configured to queue the selected scenario as a job on the queue database 72'. The queue database 72' may be substantially similar to the queue database 72 described above.

The cloud server 74' may be configured to retrieve one or more jobs from the queue database 72'. The cloud server 74' may be like the executing device 74 described above and/or may comprise an external server connected to the queue database 72' and the test protocol database 70' via a communications network. The cloud server 74' may be configured to retrieve a channel-specific automation script 76' related to the job from the test protocol database 70'. A channel-specific automation script 76' may be an automation script associated with a certain software application and/or variable value protocol. Additionally or alternatively, the cloud server 74' may be configured to retrieve a scenario related to the job from the test protocol database 70'. Once the cloud server 74' has retrieved the necessary variable value protocols, scenarios, and/or automation scripts, the cloud server 74' may be configured to determine underdefined variables. The cloud server 74' may be configured to request and receive values from a data fabrication engine to define the underdefined variables. Once all the necessary variables (i.e., those to be submitted to a test software application according to an automation script) are defined, the cloud server 74' may execute the software application using the automation script and thereby run the desired test(s).

Once a job has been completed, the cloud server 74' may be configured to store data related to the results of the job on the test protocol database 70'. In an embodiment, the communication server 20' may be configured to retrieve the results and display them on a communications platform executing on the communication server 20'. The communication server 20' may be substantially similar to the communication server 20 discussed above. Various computing devices, including the computing device 10', may execute clients of the communications platform in order to access and view the results on the communication server 20'. In an embodiment, the cloud server 74' is configured to parse output files to identify output variations and at least partly responsible input variable(s), with the displayed results including information and/or notifications about such output variations and/or any changes to pre-defined conditions, substantially as outlined above.

Exemplary Method for Building and Initiating Tests for a Software Application

Figure 10:
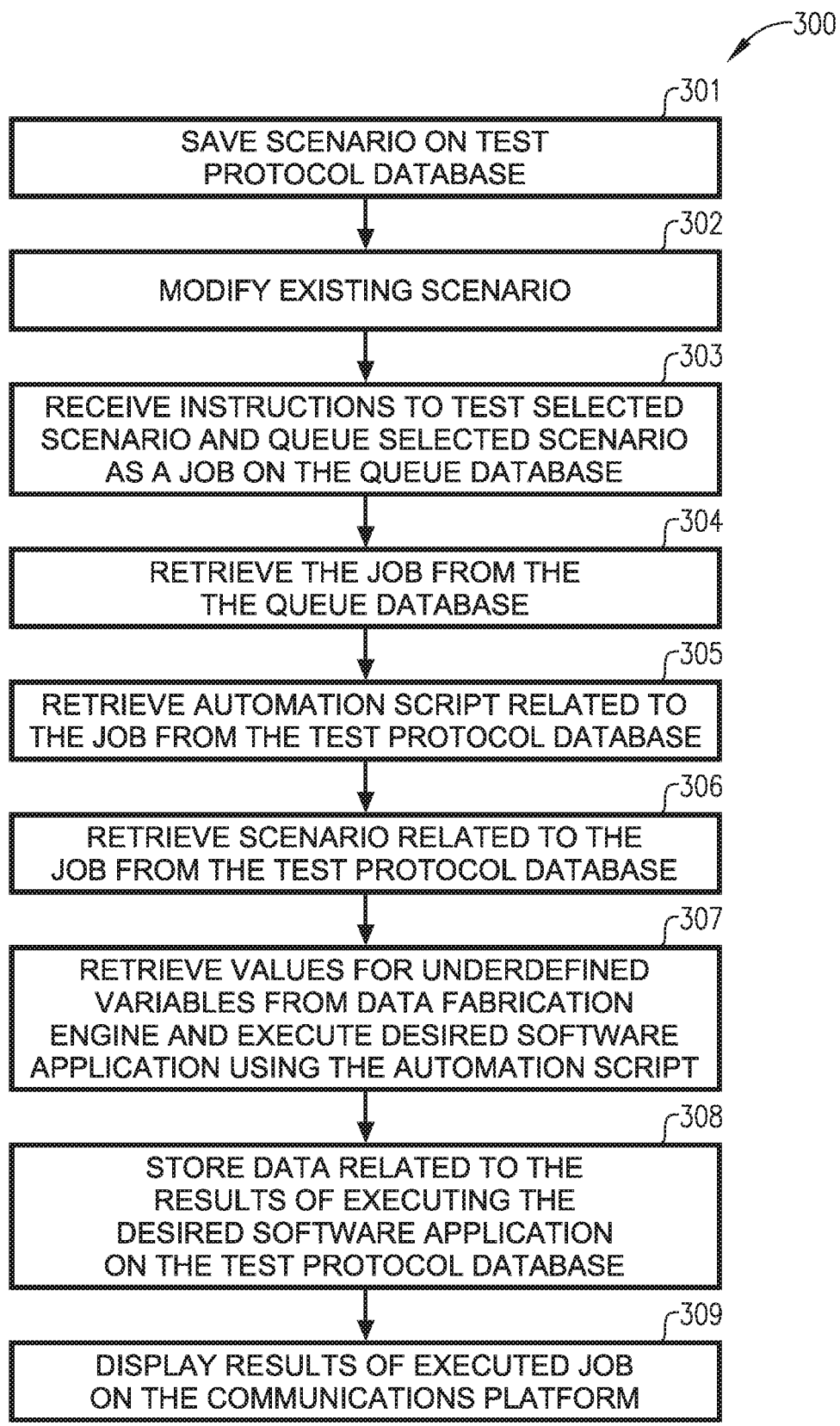
FIG. 10 is a flowchart illustrating at least a portion of the steps for defining and initiating a test for a software application in accordance with embodiments of the present invention.

FIG. 10 depicts a flowchart including a listing of steps of an exemplary computer-implemented method 300 for building and initiating a test for a software application. The steps may be performed in the order shown in FIG. 10, or they may be performed in a different order. Furthermore, some steps may be performed concurrently as opposed to sequentially. In addition, some steps may be optional.

The computer-implemented method 300 is described below, for ease of reference, as being executed by exemplary devices and components introduced with the embodiments illustrated in FIG. 9. For example, the steps of the computer-implemented method 300 may be performed by the test protocol database 70', the computing device 10', the queue database 72', the cloud server 74', and the communication server 20' through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 301, a scenario may be saved on the test protocol database 70'. The saving of the scenario may include instructions to save received via a user interface at the computing device 10'.

Referring to step 302, a scenario may be modified via the computing device 10'. The scenario may be an existing scenario retrieved from the test protocol database 70' or a newly created scenario generated at the computing device 10'. The modifying of the scenario may include receiving a selection of a variable value protocol, a selection of a selectable variable of the variable value protocol, and/or a definition of a value of the selected variable via the user interface of the computing device 10', as well as applying those modifications via the computing device 10'. The modification may also include removing a definition of a variable. It is foreseen that the scenario may be modified any number of ways without departing from the spirit of this invention.

Referring to step 303, once a scenario is finalized, instruction to test a selected scenario may be received via the computing device 10', and the selected scenario may be queued as a job on the queue database 72'. The job may be positioned on the queue database 72' according to a first-in-first-out order. However, the job may also be positioned in any order, such as based on a priority index set by the test manager or other user.

Referring to steps 304, 305, and 306, the job may be retrieved from the queue database 72' by the cloud server 74', and one or more scenarios and/or automation scripts corresponding to the job may be retrieved from the test protocol database 70'. The job may include a reference to the corresponding scenarios and/or automation scripts.

Referring to steps 307, values for underdefined variables may be retrieved from the data fabrication engine, and the desired software application may be executed using the automation script via the cloud server 74'. The cloud server 74' may be configured to analyze the variable value protocol(s) of the job and determine which of the variables represented therein have no assigned value or are otherwise underdefined (e.g., where pre-defined conditions are provided to partly define the value(s), but have not been resolved to a test data manually and/or via the data fabrication engine yet). The cloud server 74' may request values for those variables from the data fabrication engine.

Referring to step 308, data related to the results of executing the desired software application—for example, output files—may be stored in the test protocol database 70'. The data may include any errors that were presented during execution, any outputs of the software application, any metadata (such as versions of the software application, variable value protocols, automation scripts, etc.), and the like.

Referring to step 309, the results of the executed job may be displayed on the communication platform via the communication server 20'. The cloud server 74' may be configured to transmit the results to the test protocol database 70', and the communication server 20' may be configured to access the results and broadcast them to any and/or all computing devices running a client of the communication platform. In an embodiment, the cloud server 74' is configured to parse output files to identify output variations and at least partly responsible input variable(s), with the displayed results including information and/or notifications about such output variations and/or any changes to pre-defined conditions, substantially as outlined above.

ADDITIONAL CONSIDERATIONS

In this description, references to "an embodiment", "an embodiment", or "embodiments" mean that the feature or features being referred to are included in at least an embodiment of the technology. Separate references to "an embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in an embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A computer-implemented method for version tracking of a software application to identify variations in treatment of an input variable, the method comprising:
    automatically receiving, from a pre-defined condition database, a pre-defined condition relating to permissible value(s) for at least one of the input variables,
    automatically executing, via an executing device, a first version of the software application to generate a first output file;
    automatically executing, via the executing device, a second version of the software application to generate a second output file;
    automatically comparing the first output file against the second output file to identify an output variation between the first output file and the second output file, the output variation attributable to varied treatment of the input variable between the first version of the software application and the second version of the software application; and
    automatically writing data representing the input variable to a record in response to the identification of the output variation,
    wherein the pre-defined condition database is configured to store revision history metadata in association with the pre-defined condition,
    wherein the first output file and the second output file each comprises metadata associated with the input variable.

2. The computer-implemented method of claim 1, wherein—
    the automatic execution steps performed by the executing device include submitting one or more input values in response to prompts from the software application,
    each of the one or more input values corresponds to a variable,
    the one or more corresponding variables include the input variable,
    each of the one or more input values is automatically retrieved in connection with performance of the automatic execution steps.

3. The computer-implemented method of claim 2, further comprising storing the first output file and the second output file in association with metadata identifying the first version of the software application and the second version of the software application.

4. The computer-implemented method of claim 1, further comprising automatically displaying at least a portion of the revision history metadata at a user interface.

5. The computer-implemented method of claim 4, wherein the at least a portion of the revision history metadata is automatically displayed upon selection of at least one variable value protocol.

6. The computer-implemented method of claim 1, wherein the data of the record includes a version identifier for each of the first version of the software application and the second version of the software application.

7. The computer-implemented method of claim 1, wherein the value of the input variable is automatically retrieved by prompting a variable value protocol with the input variable and a class of the input variable.

8. A computer-implemented method for version tracking of a software application to automatically identify variations in treatment of an input variable, the method comprising:
    automatically receiving, from a pre-defined condition database, a pre-defined condition relating to permissible value(s) for at least one of the input variable,
    automatically receiving a value for the input variable from a variable value protocol;
    automatically executing a latest version of the software application;
    automatically submitting the value to the latest version of the software application;
    automatically determining a first output from the latest version of the software application attributable at least in part to submission of the value of the input variable;
    automatically retrieving from a database storing a second output attributable at least in part to submission of a previous value of the input variable in connection with execution of a previous version of the software application;

automatically comparing the first output against the second output to identify a variation between the first output and the second output, the variation at least partly attributable to varied treatment of the values of the input variable between the latest version of the software application and the previous version of the software application;
automatically writing data representing the input variable to a record in response to the identification of the variation; and
wherein the first output file and the second output file each comprises metadata associated with the input variable,
wherein the pre-defined condition database is configured to store revision history metadata in association with the pre-defined condition.

9. The computer-implemented method of claim 8, wherein the data of the record includes a version identifier for each of the latest version and the previous version of the software application.

10. The computer-implemented method of claim 8, wherein the value of the input variable is automatically retrieved by prompting a variable value protocol with the input variable and a class of the input variable.

11. The computer-implemented method of claim 10, further comprising automatically obtaining the class of the input variable from a pre-defined condition database that stores a plurality of pre-defined conditions imposed on the class.

12. The computer-implemented method of claim 8, further comprising automatically notifying a user of the variation.

13. A system for version tracking of a software application to automatically identify an output variation in treatment of an input variable represented in a variable value protocol corresponding to the software application, the system comprising:
a test protocol database configured to store the variable value protocol, an automation script corresponding to the software application, and results of testing a previous version of the software application, the results being at least partly attributable to the input variable;
a pre-defined condition database configured to store revision history metadata in association with a pre-defined condition relating to permissible value(s) for the input variable; and
a computing device in communication with the test protocol database, the computing device configured to—
retrieve from the test protocol database the variable value protocol, the automation script, and the results,
receive from the pre-defined condition database the pre-defined condition,
receive a value for the input variable,
execute a latest version of the software application,
submit the value to the latest version of the software application according to the automation script,
determine a first output from the latest version of the software application attributable at least in part to submission of the value of the input variable,
compare the first output against the results to identify the output variation, the output variation attributable to varied treatment of the input variable between the latest version of the software application and the previous version of the software application, and
write data corresponding to the input variable to a record in response to the identification of the output variation,
wherein the first output comprises metadata associated with the input variable,
wherein the results comprise metadata associate with the input variable.

14. The system of claim 13, wherein the variable value protocol includes a plurality of variables, and the computing device is configured to receive user-defined values from the variable value protocol for a first subset of the plurality of variables and to automatically retrieve engine-defined values from a data fabrication engine for a second subset of the plurality of variables.

15. The system of claim 13, wherein the computing device is configured to verify that a first version of the automation script used in the test of the previous version of the software application is substantially identical to a second version of the automation script used in execution of the latest version of the software application.

16. The system of claim 13, wherein the computing device is configured to store the record on the test protocol database in association with metadata identifying the previous version of the software application, the latest version of the software application, a version of the variable value protocol, and a version of the automation script.

17. The system of claim 16, wherein one or more computing devices are configured to automatically retrieve the record from the test protocol database in response to a selection of the input variable.

18. The system of claim 17, wherein the one or more computing devices are configured to automatically display the output variation.

19. The system of claim 16, wherein one or more computing devices are configured to automatically retrieve the output variation from the test protocol database in response to modification of the variable value protocol.

20. The system of claim 16, wherein one or more computing devices are configured to automatically retrieve the output variation from the test protocol database in response to selection of the variable value protocol.

* * * * *